(12) United States Patent
Fedak et al.

(10) Patent No.: US 9,897,049 B2
(45) Date of Patent: Feb. 20, 2018

(54) AIR INTAKE TRACT WITH A HYDROCARBON ADSORBER AND RELATED MANUFACTURING METHODS

(71) Applicant: MANN+HUMMEL GMBH, Ludwigsburg (DE)

(72) Inventors: Erich Fedak, Kalamazoo, MI (US); Timothy Molascon, Kalamazoo, MI (US); Jason Worrall, Portage, MI (US)

(73) Assignee: MANN+HUMMEL GmbH, Ludwigsburg (DE)

( * ) Notice: Subject to any disclaimer, the term of this patent is extended or adjusted under 35 U.S.C. 154(b) by 26 days.

(21) Appl. No.: 15/086,692

(22) Filed: Mar. 31, 2016

(65) Prior Publication Data
US 2016/0290293 A1    Oct. 6, 2016

Related U.S. Application Data

(63) Continuation-in-part of application No. 14/674,074, filed on Mar. 31, 2015, now Pat. No. 9,541,043.

(51) Int. Cl.
*B01D 53/02* (2006.01)
*F02M 35/02* (2006.01)
(Continued)

(52) U.S. Cl.
CPC ..... *F02M 35/0218* (2013.01); *B01D 53/0415* (2013.01); *F02M 35/0202* (2013.01);
(Continued)

(58) Field of Classification Search
CPC ........ B01D 2253/102; B01D 2253/202; B01D 2253/306; B01D 2253/342; B01D 2257/702; B01D 2259/4146; B01D 53/02; B01D 53/0446; G02M 25/0854; Y10S 55/30; G06F 15/16; G06F 17/30386; G06F 17/30598; G06F 17/30864; G06F 17/30876; H04N 21/23109; H04N 21/23439;
(Continued)

(56) References Cited

U.S. PATENT DOCUMENTS 4,289,513 A * 9/1981 Brownhill ........... A61F 13/8405
                                                 162/158
4,386,947 A * 6/1983 Mizuno .................. B01D 53/02
                                                 123/519
(Continued)

FOREIGN PATENT DOCUMENTS

CN         203090549 U    7/2013
GB         1225751 A      3/1971

*Primary Examiner* — Christopher P Jones
(74) *Attorney, Agent, or Firm* — James Hasselbeck

(57) ABSTRACT

An air intake tract with a hydrocarbon adsorber is provided for adsorbing hydrocarbons of a motor vehicle. The hydrocarbon adsorber includes at least one first layer constructed of a hydrocarbon adsorbing material. Optionally, one or more stacked layers are provided including at least an uppermost layer and at least one intermediate layer. The at least one first layer includes a solid shape within an outer boundary and is adapted for sonic welding onto an interior of the air intake tract. The uppermost layer and any intermediate layers include an opening such that the uppermost layer provides access for a sonic welding tool from an upper side of the subassembly to the at least one first layer through the opening.

15 Claims, 5 Drawing Sheets

(51) Int. Cl.
*F02M 35/024* (2006.01)
*F02M 35/10* (2006.01)
*B01D 53/04* (2006.01)

(52) U.S. Cl.
CPC .. *F02M 35/02416* (2013.01); *F02M 35/1036* (2013.01); *F02M 35/10321* (2013.01); *B01D 2253/102* (2013.01); *B01D 2253/34* (2013.01); *B01D 2257/7022* (2013.01); *B01D 2259/4516* (2013.01)

(58) Field of Classification Search
CPC .. H04N 21/27; H04N 21/278; H04N 21/4143; H04N 21/44004; H04N 21/44209; H04N 21/4621
See application file for complete search history.

(56) References Cited

U.S. PATENT DOCUMENTS

| | | | | |
|---|---|---|---|---|
| 5,417,743 A * | 5/1995 | Dauber | ............ | B01D 46/10 360/99.15 |
| 5,593,482 A * | 1/1997 | Dauber | ............ | B01D 53/0407 55/385.6 |
| 6,113,864 A * | 9/2000 | Kueper | ............ | B01D 53/9472 29/890 |
| 6,214,095 B1 * | 4/2001 | Logan | ............ | B01D 53/0407 55/385.6 |
| 7,182,802 B2 | 2/2007 | Bause et al. | | |
| 7,473,306 B2 | 1/2009 | Uemura et al. | | |
| 7,597,745 B2 * | 10/2009 | Lebowitz | ............ | B01D 53/02 55/385.3 |
| 8,147,599 B2 * | 4/2012 | McAlister | ............ | F17C 11/005 206/0.7 |
| 9,409,126 B2 * | 8/2016 | McAlister | ............ | F17C 11/005 |
| 2002/0194990 A1 * | 12/2002 | Wegeng | ............ | B01D 53/06 95/114 |
| 2004/0060447 A1 * | 4/2004 | Powell | ............ | B01D 53/0407 96/154 |
| 2005/0081717 A1 * | 4/2005 | Meiller | ............ | B01D 53/02 96/154 |
| 2005/0139077 A1 * | 6/2005 | Garikipati | ............ | B01D 53/0415 96/130 |
| 2009/0065436 A1 * | 3/2009 | Kalayci | ............ | B01D 39/1623 210/679 |
| 2009/0090245 A1 * | 4/2009 | Olszewski | ............ | B01D 46/0005 96/154 |
| 2009/0261032 A1 | 10/2009 | Gohle et al. | | |
| 2011/0072974 A1 * | 3/2011 | Patel | ............ | B01D 53/02 96/147 |
| 2014/0109878 A1 * | 4/2014 | Bellis | ............ | B01D 53/0407 123/519 |

* cited by examiner

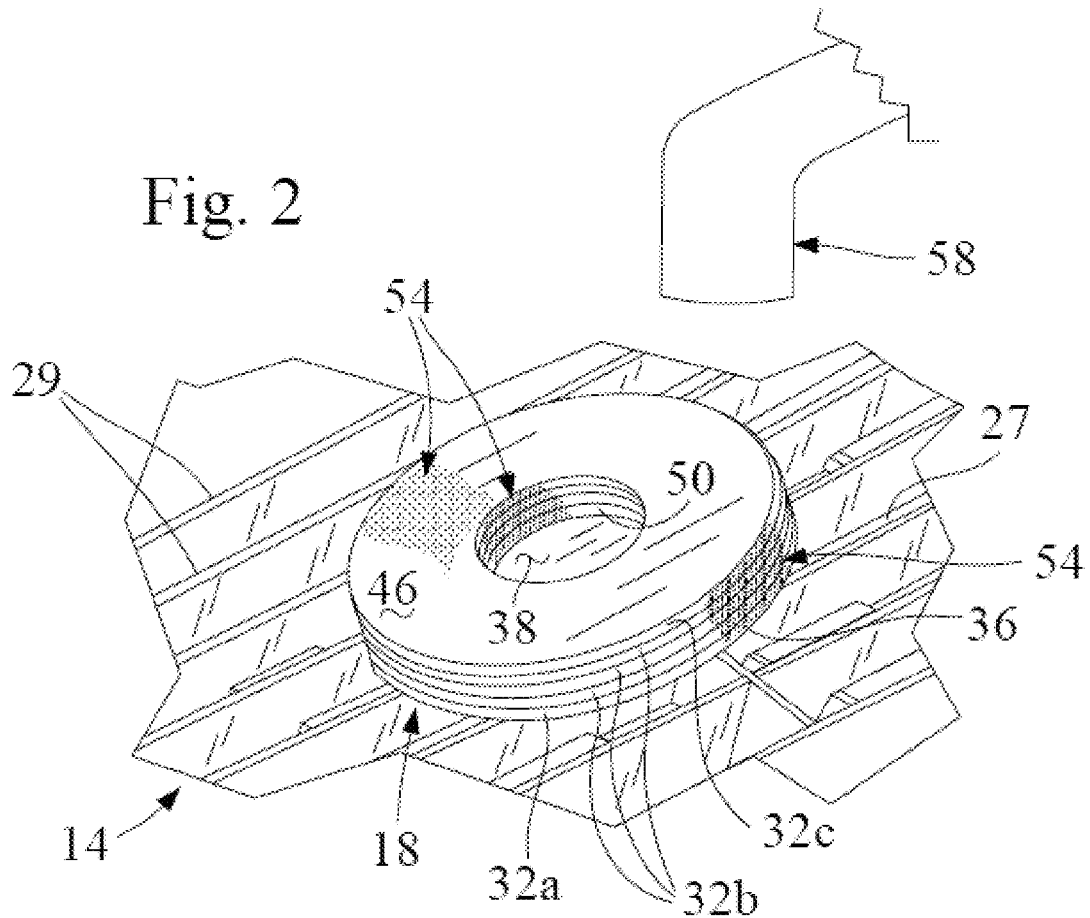

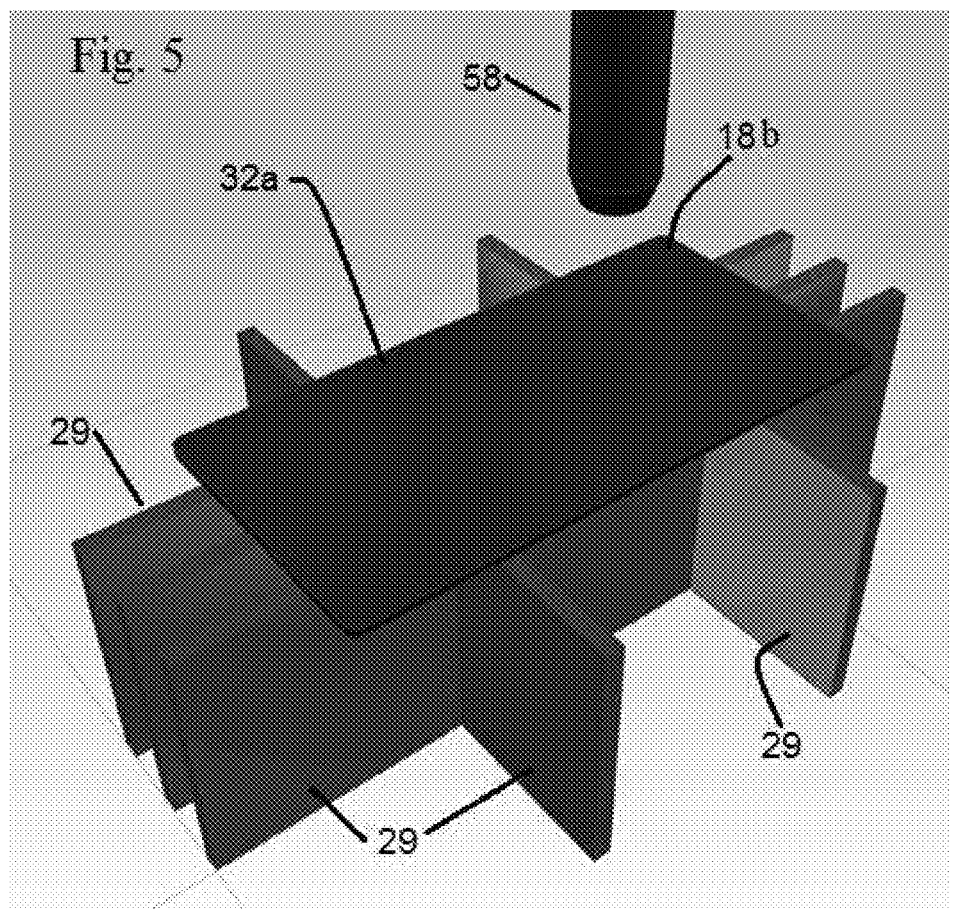

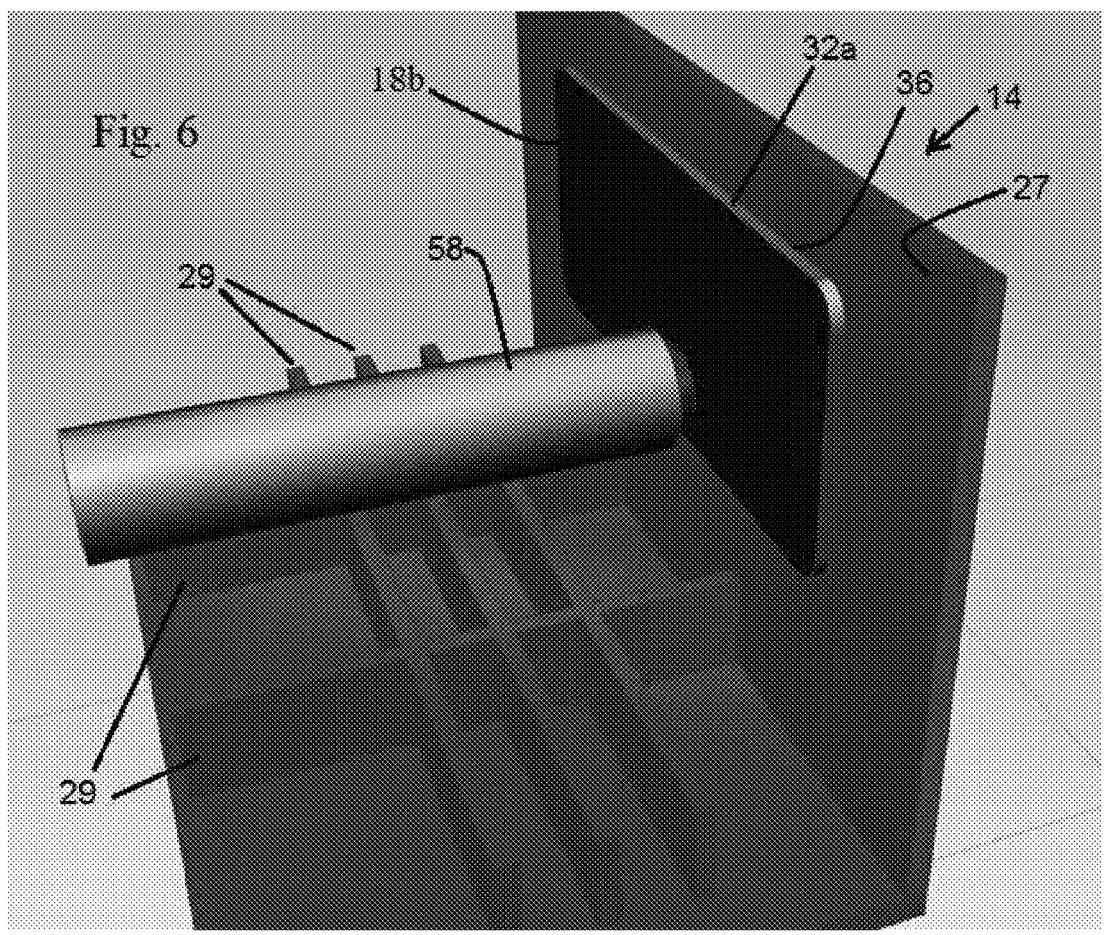

AIR INTAKE TRACT WITH A HYDROCARBON ADSORBER AND RELATED MANUFACTURING METHODS

CROSS-REFERENCE TO RELATED APPLICATION

This application is a continuation-in-part of application Ser. No. 14/674,074 filed 31 Mar. 2015.

FIELD

The present disclosure relates to a hydrocarbon adsorber and related methods of manufacturing and assembling a hydrocarbon adsorber. More particularly, the present disclosure relates to a hydrocarbon adsorber that may be sonically welded to an air induction system.

BACKGROUND

This section provides background information related to the present disclosure and is not necessarily prior art.

Air induction systems are used in motor vehicles and for other applications to transport air from the environment to an engine for combustion. While operating, the engine continuously draws air through the air induction system and into the combustion chamber. When the engine shuts down, or otherwise ceases operating, air may flow in the reverse direction, into the air induction system and the environment from the combustion chamber or other portions of the engine. Air that flows from the engine into the air induction system may include hydrocarbons, formed by the evaporation or vaporization of un-combusted fuel. Government regulations require that the amount of hydrocarbons in the air that flows from the engine and into the atmosphere be minimized. For this reason, a hydrocarbon adsorber may be placed within a portion of the air induction system. The hydrocarbon adsorber can adsorb hydrocarbons that might otherwise be released into the atmosphere from the engine after engine shutdown.

While known hydrocarbon adsorbers have proven to be acceptable for their intended purposes, a continuous need for improvement in the relevant art remains. In this regard, it would be desirable to provide a hydrocarbon adsorber, and a related method of manufacturing and assembling a hydrocarbon adsorber, that would allow for the use and assembly of the hydrocarbon adsorber in a modular manner across various vehicles and/or vehicle platforms.

SUMMARY

This section provides a general summary of the disclosure, and is not a comprehensive disclosure of its full scope or all of its features.

According to one particular aspect, the present disclosure provides a subassembly for adsorbing hydrocarbons with an air intake system of a motor vehicle. The subassembly may include at least one layer or more layers stacked onto each other. The one or more stacked layers constructed of a hydrocarbon adsorbing material. The at least one stacked layers may include at least one lowermost layer and an uppermost layer. The at least one lowermost layer may include a solid shape within an outer boundary. The at least one lowermost layer may be adapted for attachment to a component of the air intake system. The uppermost layer may include an opening such that the uppermost layer provides access from an upper side of the subassembly to the at least one lowermost layer through the opening for attaching the subassembly to the component.

In some configurations, each of the at least one lowermost layer and the uppermost layer, if present, may include a generally circular outer perimeter, or a generally polygonal outer perimeter, for example rectangular.

In some configurations, the subassembly may be generally cylindrical, or generally polygonal, for example rectangular.

In some configurations, the opening of the uppermost layer may be generally circular, or generally polygonal, for example rectangular.

In some configurations, the opening of the uppermost layer may be concentrically located relative to the outer boundary.

In some configurations, the subassembly may include an adhesive disposed between the uppermost layer and the at least one lowermost layer.

In some configurations, the subassembly may include at least one intermediate layer disposed between the at least one lowermost layer and the uppermost layer, the at least one intermediate layer including an opening such that the at least one intermediate layer provides access from the upper side of the subassembly to the at least one lowermost layer through the opening of the at least one intermediate layer for attaching the subassembly to the component.

In some configurations, the opening of the at least one intermediate layer may be aligned with the opening of the uppermost layer.

In some configurations, an adhesive may be disposed between the uppermost layer and the at least one intermediate layer and between the lowermost layer and the at least one intermediate layer.

According to another particular aspect, the present disclosure provides a component for an air intake system of a motor vehicle. The component may include a housing, such as a filter housing, and a subassembly for adsorbing hydrocarbons. The housing may include an input port for receiving a source of intake air and an output port in fluid communication with an engine of the motor vehicle. The subassembly may include one or more stacked layers constructed of a hydrocarbon adsorbing material. The stacked layers may include at least one lowermost layer and an uppermost layer. The at least one lowermost layer may include a solid shape within an outer boundary. The at least one lowermost layer may be adapted for attachment to the housing. The one or more stacked layers may include an uppermost layer defining an opening such that the uppermost layer provides access from an upper side of the subassembly to the at least one lowermost layer through the opening for attaching the subassembly to the housing.

According to yet another particular aspect, the present disclosure provides a method for controlling hydrocarbon emissions from a vehicle. The method may include a providing a hydrocarbon adsorber having first and optionally second layers of a hydrocarbon adsorbing material. The second layer of the hydrocarbon adsorbing material may be supported by the first layer of the hydrocarbon adsorbing material. The second layer may include a through hole configured to provide access to the second layer. The method may also include placing the hydrocarbon adsorber in an air intake system of the vehicle such that the first layer is in direct contact with a component of the air intake system. The method may further include placing an sonic welding tool onto the at least one first layer, and if additional layers are stacked, then in the through a hole in the second layers and sonically welding the first layer onto the component.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a simplified schematic view of an air induction system including a hydrocarbon adsorbers in accordance with the teachings of the present disclosure, the air induction system shown operatively associated with a source of intake air and a vehicle engine;

FIG. 1a is a simplified schematic view of an air induction system including hydrocarbon adsorbers in accordance with the teachings of the present disclosure. The hydrocarbon adsorbers are similar to those of FIG. 1, differing in shape (rectangular vs circular). The air induction system shown operatively associated with a source of intake air and a vehicle engine;

FIG. 2 is a schematic perspective view of the hydrocarbon adsorber of FIG. 1 disposed within a portion of the air induction system;

Figure 1:
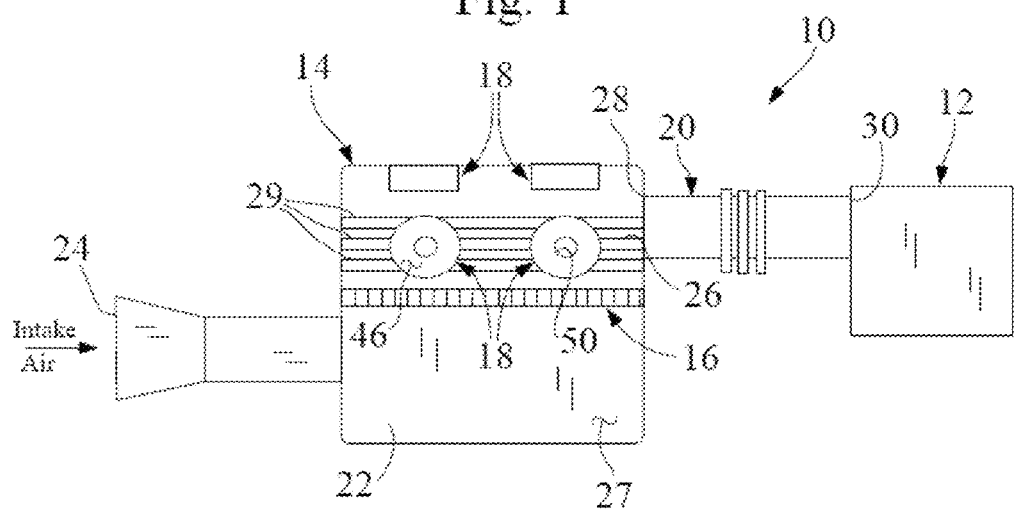

FIG. 5 is a perspective view of a hydrocarbon adsorber sonic welded onto housing ribs or fins in the interior of a housing of the air induction system in accordance with the teachings of the present disclosure; and FIG. 6 Is a perspective view including a hydrocarbon adsorber sonically welded onto an interior surface of the housing of the air induction system in accordance with the teachings of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
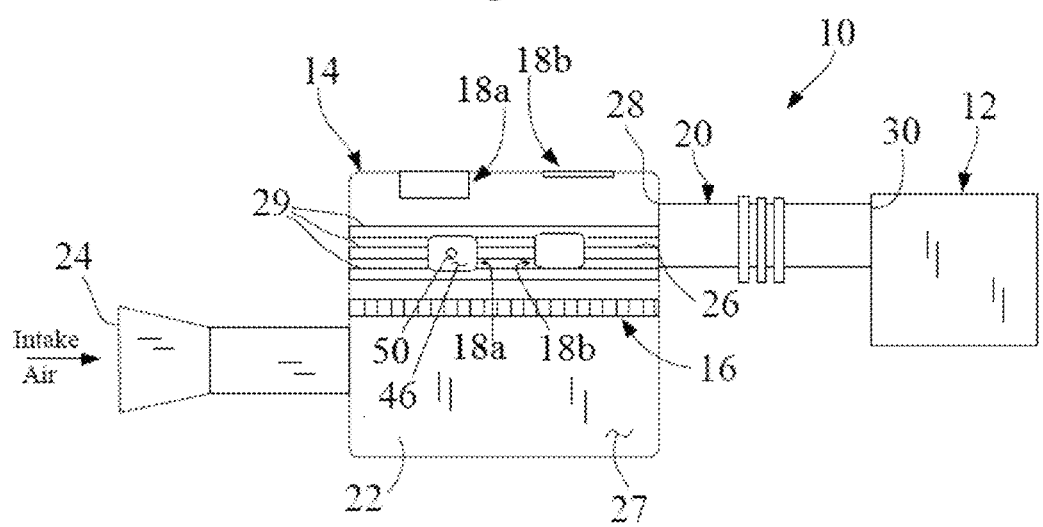

With initial reference to FIGS. 1 and 1a, a simplified view of an air induction system 10 constructed in accordance with the present teachings is illustrated. The air induction system 10 may be used to transport and filter air from and between the environment and an engine 12 or other device utilizing a flow of air. The engine 12 may be an internal combustion engine for a motor vehicle (not shown). It will be understood, however, that the present teachings are not limited to this exemplary use. Rather, the present teachings may be readily adapted for use with other combustion engines utilized in other applications.

As shown in FIGS. 1 and 1a, the air induction system 10 may generally include an air filter housing 14, an air filter 16 in the air filter housing 14, at least one hydrocarbon adsorber 18, 18a, 18b, and a duct 20. The air filter housing 14 may define a working chamber 22 and may include an inlet 24 in fluid communication with the environment (e.g., source of intake air) and an outlet 26 in fluid communication with the duct 20. With reference to FIGS. 1, 1a and 2, the air filter housing 14 may also include an inner surface 27 having a plurality of fins or ribs 29 extending therefrom. The filter 16 may be disposed between the inlet 24 and the outlet 26. The filter 16 may conventionally filter or clean the air as it travels through the housing 14 from the environment to the duct 20. The duct 20 includes a first end 28 and a second end 30. The first end 28 may pass through the outlet 26 of the housing 14 and may extend into the working chamber 22. The second end 30 of the duct 20 may be secured in fluid communication with the engine 12 in any manner well known in the art.

Figure 4:
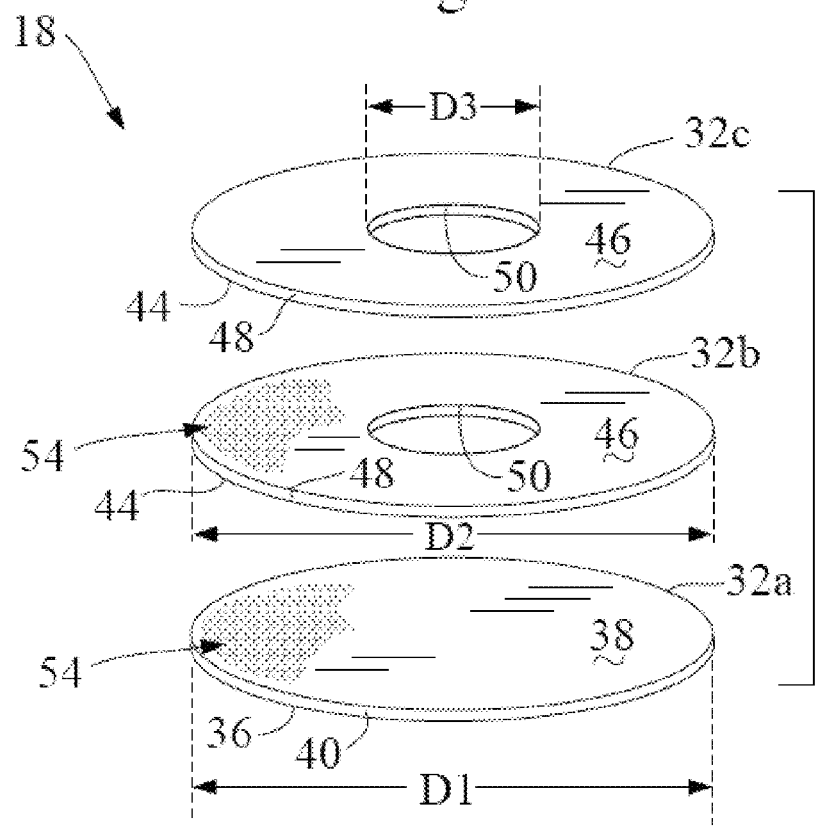
FIG. 4 is a schematic exploded view of the hydrocarbon adsorber of FIG. 1.

As illustrated in FIGS. 1, 1a and 2, the hydrocarbon adsorber 18, 18a, 18b may be disposed within the air filter housing 14. In this regard, as illustrated in FIGS. 1, 1a, the air filter housing 14 may include a plurality of hydrocarbon adsorbers. With reference to FIGS. 2 and 4, the hydrocarbon adsorber 18, as well as 18a, may include a layered construct having at least one layer or a plurality of stacked layers 32. At least one layer 32 of the hydrocarbon adsorber 18, 18a may be formed from a material configured to adsorb hydrocarbons from the air. In some configurations, each layer 32 of the hydrocarbon adsorber 18, 18a may be formed from a material configured to adsorb hydrocarbons from the air. For example, the layers 32 may be formed from a plastic material such as a fibrous layer or a fibrous sheets enclosing or containing or impregnated with or otherwise including, activated carbon. Preferably each layer comprises two spaced apart sheets of fibrous material or non-woven material with the activated carbon arranged therebetween. Preferably the activated carbon is adhesively bound together and to at least one of the sheets of each layer 32 so as to fix the activated carbon in place within each layer 32. The layers 32 may alternately be paper filter media that is impregnated with or encloses activated carbon. It will also be appreciated that activated carbon may be disposed between each of the plurality of layers 32.

As illustrated, the hydrocarbon adsorber 18 or 18a may include a first or lowermost layer 32a, and optionally a second or intermediate layer 32b, and optionally a third or uppermost layer 32c. It will be appreciated that while the hydrocarbon adsorber 18, 18a is described as having a single intermediate layer 32b, in some configurations the hydrocarbon adsorber 18, 18a may include a plurality of intermediate layers 32b, as schematically illustrated in FIG. 2. For example, in some configurations, the hydrocarbon adsorber 18, 18a may include two, three, four or five intermediate layers 32b. In other configurations, the hydrocarbon adsorber 18, 18a may include more than five intermediate layers 32b. In certain applications, the hydrocarbon adsorber 18, 18a may include at least three intermediate layers 32b.

With reference to FIG. 1a, hydrocarbon adsorbers 18a and 18b differ in shape, being generally polygonal, or preferably generally rectangular. Hydrocarbon adsorber 18a is identical ij all aspects except shape to hydrocarbon adsorber 18 of FIG. 1. Hydrocarbon adsorber 18b is hydrocarbon adsorber 18a but having only one or more first or lowermost layers 32a, stacked face to face directly upon each other. As discussed with hydrocarbon adsorbers 18 and 18a, in hydrocarbon adsorber 18b the one or more first or lowermost layers 32a preferably each include two spaced apart sheets or a folded sheet of fibrous material or non-woven material with the activated carbon arranged therebetween. Preferably the activated carbon is adhesively bound together and to at least one of the sheets of each layer 32a so as to fix the activated carbon in place within each of the one or more first or lowermost layers 32a. The one or more first or lowermost layers 32a may alternately be paper filter media that is impregnated with or encloses activated carbon. It will also be appreciated that activated carbon may be disposed between each of the one or more first or lowermost layers 32a.

With reference to FIG. 4, the lowermost layer 32a may include a bottom or mounting surface 36, an upper or mating surface 38, and an outer or peripheral boundary or surface 40 extending from and between the mounting and mating surfaces 36, 38. In some configurations, the mounting and mating surfaces 36, 38 may include a generally circular shape defining a first diameter D1, such that the lowermost layer 32a includes a generally cylindrical shape or construct. It will be appreciated, however, that the mounting and mating surfaces 36, 38 may include other shapes within the scope of the present teachings. For example, in some configurations the mounting and mating surfaces 36, 38 may include or otherwise define a rectangle, a hexagon, an octagon, or another suitable shape, such that the lowermost layer 32a includes a rectangular, hexagonal, or orthogonal prism, respectively.

The intermediate layer 32b may include a bottom or first mating surface 44, an upper or second mating surface 46, and an outer or peripheral boundary or surface 48 extending from and between the mounting and mating surfaces 44, 46. In some configurations, the first and second mating surfaces 44, 46 may include a generally circular shape defining a second diameter D2, such that the intermediate layer 32b includes a generally cylindrical shape or construct. The second diameter D2 may be substantially equal to the first diameter D1. It will be appreciated, however, that, like the mounting and mating surfaces 36, 38 of the lowermost layer 32a, the first and second mating surfaces 44, 46 of the intermediate layer 32b may include other shapes within the scope of the present teachings. In this regard, the size and/or shape of the intermediate layer 32b, as defined at least in part by the peripheral surface 48, may be substantially similar to the size and/or shape of the lowermost layer 32a. In other applications, however, the shape or size of the intermediate layer 32b may depart from the shape or size of the lowermost layer 32a.

The intermediate layer 32b of hydrocarbon adsorber 18 or 18a may further include a through-hole or opening 50 extending from and between the first and second mating surfaces 44, 46. The opening 50 may be concentrically located relative to the peripheral surface 48 of the intermediate layer 32b. In some configurations, the opening 50 may include a generally circular shape defining a third diameter D3. The size of the third diameter D3 may be between twenty percent and eighty percent of the size of the second diameter D2. In some configurations, the size of the third diameter D3 may be substantially equal to thirty-three percent of the size of the second diameter D2. While the opening 50 is illustrated and described herein as including a generally circular shape, it will be appreciated that the opening 50 may include other shapes within the scope of the present disclosure. In some applications, an area of the opening 50 may be no greater than fifty percent of an area defined by a perimeter of the intermediate layer 32b. In other applications, the area of the opening 50 may be no less than ten percent of the area defined by the perimeter of the intermediate layer 32b. In some configurations, the opening may include a rectangular, hexagonal, or octagonal shape. As shown, the opening 50 is centrally positioned. It will be understood, however, that the opening 50 may be alternatively positioned within the scope of the present teachings.

The uppermost layer 32c, if present, may be substantially similar to the intermediate layer 32b, except as otherwise provided herein. Accordingly, like numerals will be used to describe like features and components. In this regard, the uppermost layer 32c may include the bottom or first mating surface 44, the upper or second mating surface 46, the peripheral boundary or surface 48 extending from and between the mounting and mating surfaces 44, 46, and the opening 50 extending from and between the first and second mating surfaces 44, 46.

Figure 3:
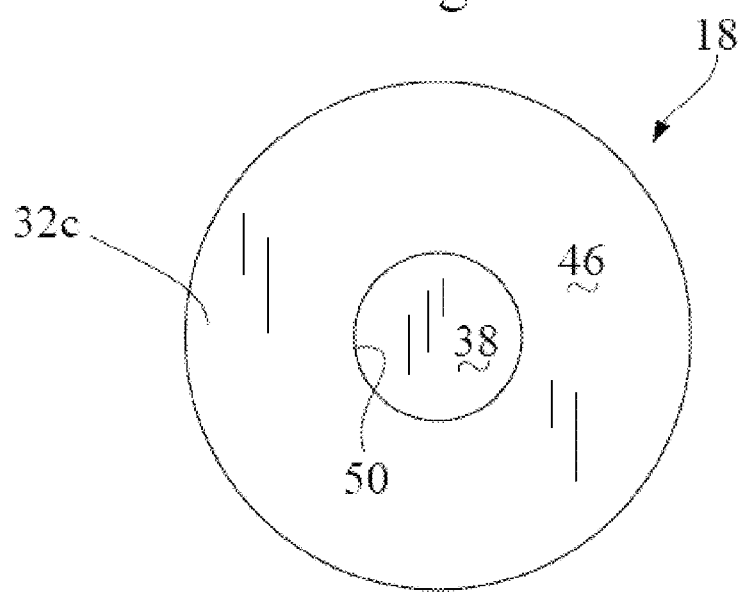
FIG. 3 is a schematic top view of the hydrocarbon adsorber of FIG. 1.

In an assembled configuration of a plurality of stacked layers, the intermediate layer 32b may be disposed and supported between the lowermost layer 32a and the uppermost layer 32c, such that the first mating surface 44 of the intermediate layer 32b is adjacent to the mating surface 38 of the lowermost layer 32a, and the second mating surface 46 of the intermediate layer 32b is adjacent to the first mating surface 44 of the uppermost layer 32c. It will be appreciated that, if the hydrocarbon adsorber 18, 18a includes more than one intermediate layer 32b, the first mating surface 44 of at least one of the intermediate layers 32b may be adjacent to the second mating surface 46 of another of the intermediate layers 32b. Accordingly, as illustrated, in the assembled configuration the mounting surface 36 of the lowermost layer 32a and the second mating surface 46 of the uppermost layer 32c may each be exposed surfaces. The peripheral surfaces 40, 48 of the uppermost, intermediate, and lowermost layers 32a, 32b, 32c may be aligned, such that the opening 50 of the intermediate layer 32b is aligned with the opening 50 of the uppermost layer 32c. Accordingly, as illustrated in FIGS. 2 and 3, in the assembled configuration a portion of the mating surface 38 of the lowermost layer 32a may be visible, and otherwise accessible, through the openings 50 of the intermediate and uppermost layers 32b, 32c.

FIG. 5 is a perspective view of a hydrocarbon adsorbers 18a, 18b arranged for sonic welding onto filter housing ribs or fins within the interior of the air induction system, in accordance with the teachings of the present disclosure. The hydrocarbon adsorber 18a may include a layered construct with one or more first or lowermost layers 3, as discussed with FIGS. 1-4. In the illustration of FIG. 5, hydrocarbon absorber 18b has a single first or lowermost layers 32a, although it may have a plurality of stacked first or lowermost layers 32a. As in FIG. 2, it is to be understood that the hydrocarbon adsorber schematically illustrated for simplicity as 18b may be include one or more intermediate layers and optionally a third or uppermost layer forming the hydrocarbon adsorber 18a as discussed earlier above. The hydrocarbon adsorber of FIG. 5 differs from the hydrocarbon adsorber of FIG. 2 in that the hydrocarbon adsorber 18b of FIG. 5 has a generally rectangular outer perimeter and, as illustrated in the example of FIG. 5, is shown in this embodiment with at least one first or lowermost layers 32a, without the intermediate and uppermost layers. In some configurations, each layer of the hydrocarbon adsorber 18b may be formed from a material configured to adsorb hydrocarbons from the air. For example, the at least one lowermost layer 32a may be formed from a plastic material such as a fibrous layer or a fibrous sheet enclosing or containing or impregnated with or otherwise including, activated carbon. The at least one lowermost layers 32a may alternately be paper filter media that is impregnated with or encloses activated carbon. Each lowermost layer 32a may advantageously comprise two spaced sheets of fibrous material or non-woven material with the activated carbon arranged therebetween. Preferably the activated carbon is adhesively bound together and onto at least one of the sheets of the lowermost layer 32a so as to fix the activated carbon in place within the one or more lowermost layers 32a. Similarly activated carbon is arranged between sheets of the second or intermediate and the third or uppermost layer, when provided as shown in the example of FIG. 4. Preferably the activated carbon is adhesively bound together and onto at least one of the sheets of the layer so as to fix the activated carbon in place within the layer.

FIG. 6 Is a perspective view including a hydrocarbon adsorber 18b arranged for sonic welding onto an interior surface 27 of a housing of the air induction system in accordance with the teachings of the present disclosure. The hydrocarbon adsorber 18b may include a layered construct with one or more first or lowermost layers 32a. In the illustration of FIG. 6, a single first or lowermost layers 32a is illustrated. As in FIG. 2, the hydrocarbon adsorber 18b may optionally include one or more intermediate layers and optionally a third or uppermost layer forming hydrocarbon adsorber 18a discussed above. The hydrocarbon adsorber of FIG. 6 differs from the hydrocarbon adsorber of FIG. 2 in that the hydrocarbon adsorber 18b of FIG. 6 has a generally rectangular outer perimeter and, as illustrated in the example of FIG. 6, is shown in this embodiment with only one more first or lowermost layers 32a, without the intermediate and uppermost layers. In some configurations, each layer 32a of the hydrocarbon adsorber 18b may be formed from a material configured to adsorb hydrocarbons from the air. For example, the lowermost layer 32a may be formed from a plastic material such as a fibrous layer or a fibrous sheet enclosing or containing or impregnated with or otherwise including, activated carbon. The lowermost layers 32a may alternately be paper filter media that is impregnated with or encloses activated carbon. The lowermost layer 32a may advantageously comprise two spaced sheets of fibrous material or non-woven material or a single sheet folded over one itself forming two facing sheet portion, and with the activated carbon arranged therebetween. Preferably the activated carbon is adhesively bound together and to at least one of the sheets of the lowermost layer 32a so as to fix the activated carbon in place within the one or more lowermost layers 32a. Similarly activated carbon is arranged between sheets of the second or intermediate and the third or uppermost layer, when present as shown in the stacked arrangement of example of FIG. 4. Preferably the activated carbon is adhesively bound together and onto at least one of the sheets of the layer so as to fix the activated carbon in place within the layer.

With particular reference to FIG. 4, a method of assembling or otherwise manufacturing the hydrocarbon adsorber 18, 18a will be understood to include cutting, stamping, or otherwise providing at least one lowermost layer, and optionally intermediate and uppermost layers 32a, 32b, 32c from a stock of the hydrocarbon adsorbing material described above, and cutting, stamping, drilling or otherwise creating the opening 50 in the intermediate and uppermost layers 32b, 32c. The lowermost, intermediate and uppermost layers 32a, 32b, 32c can be stacked or otherwise assembled such that the intermediate layer 32b is supported between the lowermost and uppermost layers 32a, 32c. A sealer or adhesive 54 may be applied to the mating surface 38 of the lowermost layer 32a, the first and second mating surfaces 44, 46 of the intermediate layer 32b, and/or the first mating surface 44 of the uppermost layer 32c. Accordingly, the adhesive 54 may help to ensure that the intermediate layer 32b adheres or is otherwise fixed to the lowermost and uppermost layers 32a, 32c.

With reference to FIGS. 1, 1a, 2 and 4, the method of manufacturing the hydrocarbon adsorber 18, 18a may also include applying the adhesive 54 to the peripheral and mounting surfaces 40, 36 of the lowermost layer 32a, to the peripheral surface 48 and the opening 50 of the intermediate layer 32b, and/or to the peripheral and second mating surfaces 48, 46 and the opening 50 of the uppermost layer 32c. In this regard, the adhesive 54 may be applied to the hydrocarbon adsorber 18, 18a, 18b such that the exposed surfaces of the hydrocarbon adsorber include a film or layer of the adhesive 54. In some configurations, the hydrocarbon adsorber 18, 18a, 18b may be dipped into a source of adhesive 54. In other configurations, the hydrocarbon adsorber 18, 18a, 18b may be exposed to a flow of adhesive 54. Preferably, the adhesive 54 is applied to the hydrocarbon adsorber 18, 18a, 18b in a waterfall type process to seal the edges of the hydrocarbon adsorber 18. The adhesive 54 is selected to be compatible with the materials used to construct the hydrocarbon adsorber 18, 18a, 18b and compatible with the fluids or vapors that may be present in the air induction system. It will also be appreciated that the adhesive 54 may be applied to the hydrocarbon adsorber 18, 18a, 18b using other suitable techniques. In yet other configurations, the lowermost, intermediate and/or uppermost layer 32a, 32b, 32c may be formed from a hydrocarbon adsorbing material that does not require a sealer. For example, in some configurations the lowermost, intermediate and/or uppermost layer 32a, 32b, 32c may be formed from a paper or synthetic filter media into which the hydrocarbon adsorber material is fixedly impregnated and which therefore does not require sealing with a sealer.

With reference to FIGS. 1, 1a, and 2, a method of assembling the hydrocarbon adsorber 18, 18a, 18b may include placing the hydrocarbon adsorber 18, 18a in a portion of the air induction system 10. As illustrated, in some configurations, the hydrocarbon adsorber 18, 18a, 18b may be placed on the inner surface 27 of the air filter housing 14. In this regard, in some configurations the mounting surface 36 of the lowermost layer 32a may be supported on or by the rib(s) 29 of the air filter housing 14. A portion 58 of an sonic welder (not shown) may be disposed or otherwise placed within the openings 50 of the intermediate and uppermost layers 32b, 32c and/or into direct contact with the exposed portion of the mating surface 38 of the lowermost layer 32a. The sonic welder may then be activated to sonically weld the mounting surface 36 of the lowermost layer 32a to the rib(s) 29 of the air filter housing 14.

With particular reference to FIG. 5 in view of FIGS. 3 and 4, a method of assembling or otherwise manufacturing the hydrocarbon adsorber 18a, 18b will be understood to include cutting, stamping, or otherwise providing at least one lowermost layer 32a, and optionally intermediate and uppermost layers from a stock of the hydrocarbon adsorbing material described above. The lowermost layers may be stacked or otherwise assembled face to face directly on each other. A sealer or adhesive may be applied to the mating surfaces of the layers. Accordingly, the adhesive may help to ensure that the lower layers 32a adhere or otherwise fix onto each other.

As shown in FIG. 5, the hydrocarbon adsorber 18a, 18b may be sonically welded onto fins or ribs 29 of a filter housing or other air induction system component to permanently sonically weld the first or lowermost sheet 32a of the hydrocarbon adsorber 18 onto the fins or ribs 29. Advantageously, the hydrocarbon adsorber 18 first or lowermost layer 32a is directly welded and fixed onto the interior of the air induction system without the need for frames, heat stakes or other mounting components to secure the hydrocarbon adsorber 18a, 18b to the ribs, thereby reducing component complexity, cost and weight.

With particular reference to FIG. 6 in view of FIGS. 3 and 4, a method of assembling or otherwise manufacturing the hydrocarbon adsorber 18a, 18b will be understood to include cutting, stamping, or otherwise providing at least one lowermost layer 32a, and optionally intermediate and uppermost layers from a stock of the hydrocarbon adsorbing material described above. The lowermost layers may be stacked or otherwise assembled face to face directly on each other. A sealer or adhesive may be applied to the mating surfaces of the layers. Accordingly, the adhesive may help to ensure that the lower layers 32a adhere or otherwise fix onto each other.

As shown in FIG. 6, the hydrocarbon adsorber 18b may be sonically welded onto the inner surface 27 of a housing or other air induction system component to permanently sonically weld the first or lowermost sheet 32a of the hydrocarbon adsorber 18b onto the interior of the housing. Advantageously, the hydrocarbon adsorber 18b first or lowermost layer 32a is directly welded and fixed onto the interior of the air induction system without the need for frames, heat stakes or other mounting components to secure the hydrocarbon adsorber 18b to the ribs, thereby reducing component complexity, cost and weight.

With reference to FIGS. 5 and 6, a method of assembling the hydrocarbon adsorber 18 may include placing the hydrocarbon adsorber 18b, 18c in a portion of the air induction system. As illustrated, in some configurations, the hydrocarbon adsorber 18b, 18c may be placed on the inner surface 27 of the air filter housing 14. In this regard, in some configurations the mounting surface 36 of the lowermost layer 32a may be supported on or by the rib(s) 29 of the air filter housing 14. A portion 58 of an sonic welder (not shown) may be contact directly against and lowermost layer 32a. The sonic welder may then be activated to sonically weld the mounting surface 36 of the lowermost layer 32a to the rib(s) 29 of the air filter housing 14 or onto the inner wall 27 of the air filter housing 14.

When the engine 12 is operating, air from the environment may generally travel through the air induction system 10 to the engine 12 by passing through the air filter housing 14 and the duct 20. As the air passes through the air filter housing 14, the air is filtered by the air filter 16. When the engine shuts down or otherwise ceases operating, air containing hydrocarbons may generally travel through air induction system 10, including the duct 20 and the air filter housing 14, from the engine 12. As the air containing hydrocarbons travels through the air induction system 10, the hyrdrocarbons can be adsorbed by the hydrocarbon adsorber 18.

It will be appreciated that the configuration of the hydrocarbon adsorber 18, 18a and 18b, including the exposed mounting surface 36 of the lowermost layer 32a, and the opening 50 (if present) formed in the intermediate and uppermost layers 32b, 32c, can make it easier to mount the hydrocarbon adsorber 18, 18a, 18b directly to a portion of the air induction system 10 (e.g., the rib(s) 29 of the air filter housing 14) using the sonic welder. In this regard, it will also be appreciated that the configuration of the hydrocarbon adsorber 18, 18a, 18b, including the exposed mounting surface 36, can improve the modularity of the hydrocarbon adsorber 18, 18a, 18b, such that the hydrocarbon adsorber can be used in various air induction systems having various, and differing (e.g., size, shape, etc.), air filter housings.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An air intake system of a motor vehicle, comprising:
    a housing having:
        a working chamber in communication with the air flow in the air intake system,
        wherein the housing forms a plurality of ribs on an interior surface of the housing the plurality of ribs, each rib projecting inwardly into the working chamber to an inward rib edge in the working chamber;
    a hydrocarbon adsorber arranged within the working chamber and in communication with the air flow in the air intake system, the hydrocarbon adsorber including:
        at least one first layer constructed of a hydrocarbon adsorbing material, the at least one first layer including:
            a least one sheet of a fibrous material;
            activated carbon arranged on the at least one sheet, the activated carbon at least substantially enclosed by or impregnated into the at least one sheet;
        wherein the at least one first layer has a solid shape within an outer boundary, the at least one layer adapted for attachment to the plurality of ribs of the housing;
        wherein the at least one layer has a mounting surface;
        wherein the mounting surface is fixedly mounted onto two or more of the inward rib edges of the housing, the fixed mounting by sonic welding of the mounting surface of the hydrocarbon adsorber onto the inward rib edges;
        wherein at least a portion of the mounting surface of the hydrocarbon adsorber is in communication with air flow in the intake system due to spacing between the mounting surface and the interior surface of the housing provided by the at least one rib projecting into the working chamber.

2. The air intake system of claim 1, wherein
    the activated carbon is adhesively bound together and onto at least one of the sheets of the at least one first layer so as to fix the activated carbon in place within the hydrocarbon adsorber.

3. An air intake system of a motor vehicle, comprising:
    a housing having a working chamber in communication with the air flow in the air intake system;
    a hydrocarbon adsorber arranged within the working chamber and in communication with the air flow in the air intake system, the hydrocarbon adsorber including:
        at least one first layer constructed of a hydrocarbon adsorbing material, the at least one first layer including
            a least one sheet of a fibrous material;
            activated carbon arranged on the at least one sheet, the activated carbon at least substantially enclosed by or impregnated into the at least one sheet;
        wherein the at least one first layer has a solid shape within an outer boundary, the at least one layer adapted for attachment to a component within an interior of the housing;
        wherein the at least one layer has a mounting surface;
        wherein the mounting surface is fixedly mounted onto an interior surface of the housing, the fixed mounting by sonic welding of the mounting surface of the hydrocarbon adsorber onto the interior surface of the housing;
        wherein the hydrocarbon adsorber further includes:
            an uppermost layer, the uppermost layer having an opening such that the uppermost layer provides access from an upper side of the hydrocarbon adsorber to the at least one first layer through the opening;
            wherein the opening is sized and configured to receive a sonic welding tool therein to contact the at least first layer, for fixedly mounting the hydrocarbon adsorber onto the interior surface of the housing by sonic welding.

4. The air intake system of claim 3, wherein
    the at least one first layer is a plurality of first layers each having a solid shape;
    wherein the plurality of first layers are stacked face to face upon each other.

5. The air intake system of claim 3, wherein
    the activated carbon is adhesively bound together and onto at least one of the sheets of the at least one first layer so as to fix the activated carbon in place within the hydrocarbon adsorber.

6. The air intake system of claim 3, wherein the
    at least one first layer has a generally circular outer perimeter, or a generally polygonal outer perimeter.

7. The air intake system of claim 3, wherein
    the opening of the uppermost layer is concentrically located relative to the outer boundary.

8. The air intake system of claim 3, further comprising
    an adhesive disposed between the uppermost layer and the at least one first layer.

9. The air intake system of claim 3, further comprising
    at least one intermediate layer disposed between the at least one first layer and the uppermost layer, the at least one intermediate layer including an opening such that the intermediate layer provides access from the upper side of the subassembly to the at least one first layer through the opening of the at least one intermediate layer for fixedly mounting the hydrocarbon adsorber onto the interior surface of the housing by sonic welding;
    wherein the opening of the at least one intermediate layer is aligned with the opening of the uppermost layer.

10. The air intake system of claim 9, further comprising
    an adhesive disposed between the uppermost layer and the at least one intermediate layer and between the at least one first layer and the at least one intermediate layer.

11. A method for controlling hydrocarbon emissions from a vehicle, the method comprising the steps of:
    providing a housing of an air intake system, the housing having an working chamber in communication with air flow in the air intake system;
    wherein the housing forms a plurality of ribs on an interior surface of the housing the plurality of ribs, each rib projecting inwardly into the working chamber to an inward rib edge in the working chamber;
    providing a sonic welding tool;

providing a hydrocarbon adsorber having at least one first layer constructed of a hydrocarbon adsorbing material, the at least one first layer including:
a least one sheet of a fibrous material;
activated carbon at least substantially enclosed by or impregnated in the at least one sheet;
wherein the at least one first layer has a solid shape within an outer boundary, the at least one layer adapted for attachment to a component within an interior of the housing;
wherein the at least one layer has a mounting surface;
placing the hydrocarbon adsorber in the working chamber of the housing;
arranging the hydrocarbon adsorber to contact two or more of the inward rib edges of the housing;
placing the sonic welding tool directly onto the a least one first layer such the that at least one first layer is arranged between the sonic welding tool and the interior surface of the housing;
sonically welding the at least one first layer onto the two or more of the inward rib edges; and
removing the sonic welding tool;
wherein in the arranging step, the hydrocarbon adsorber is arranged to contact the two or more of the inward rib edges in the working chamber, such that the mounting surface of the hydrocarbon adsorber is in communication with air flow in the intake system due to spacing between the mounting surface and the interior surface of the housing provided by the plurality of ribs projecting into the working chamber;
wherein in the sonically welding step, the at least one first layer is sonically welded onto the two or more of the inward rib edges of the housing.

12. The method according to claim 11, wherein
in the step of providing a hydrocarbon adsorber, the hydrocarbon adsorber further includes
a second layer of the hydrocarbon adsorbing material supported by the at least one first layer, the second layer having a through hole configured to provide access to the first layer;
wherein in the step of placing the sonic welding tool, the sonic welding tool is placed into the through hole and contacting the at least one first layer.

13. The method of claim 12, wherein
in the step of providing a hydrocarbon adsorber, the hydrocarbon adsorber further includes
an intermediate layer disposed between the at least one first and second layer, the intermediate layer having a through hole;
wherein in the step of placing the sonic welding tool, the sonic welding tool is placed into the through hole of the second layer and the intermediate layer.

14. A method for controlling hydrocarbon emissions from a vehicle, the method comprising the steps of:
providing a housing of an air intake system, the housing having an working chamber in communication with air flow in the air intake system;
providing a sonic welding tool;
providing a hydrocarbon adsorber having at least one first layer constructed of a hydrocarbon adsorbing material, the at least one first layer including:
a least one sheet of a fibrous material;
activated carbon at least substantially enclosed by or impregnated in the at least one sheet;
wherein the at least one first layer has a solid shape within an outer boundary, the at least one layer adapted for attachment to a component within an interior of the housing;
wherein the at least one layer has a mounting surface;
placing the hydrocarbon adsorber in the working chamber of the housing;
arranging the hydrocarbon adsorber to contact an interior surface of the housing;
placing the sonic welding tool directly onto the a least one first layer such the that at least one first layer is arranged between the sonic welding tool and the interior surface of the housing;
sonically welding the at least one first layer onto the interior surface of the housing; and
removing the sonic welding tool;
wherein in the step of providing a hydrocarbon adsorber, the hydrocarbon adsorber further includes
a second layer of the hydrocarbon adsorbing material supported by the at least one first layer, the second layer having a through hole configured to provide access to the first layer;
wherein in the step of placing the sonic welding tool, the sonic welding tool is placed into the through hole and contacting the at least one first layer.

15. The method of claim 14, wherein
in the step of providing a hydrocarbon adsorber, the hydrocarbon adsorber further includes
an intermediate layer disposed between the at least one first and second layer, the intermediate layer having a through hole;
wherein in the step of placing the sonic welding tool, the sonic welding tool is placed into the through hole of the second layer and the intermediate layer.

\* \* \* \* \*